United States Patent
Myrick et al.

(10) Patent No.: US 11,226,438 B2
(45) Date of Patent: Jan. 18, 2022

(54) REFLECTIVE OPTICAL ELEMENT

(71) Applicant: CORNING INCORPORATED, Corning, NY (US)

(72) Inventors: Bruce Hildreth Myrick, Keene, NH (US); Leonard Gerard Wamboldt, Sunderland, MA (US); Kenneth Smith Woodard, New Boston, NH (US)

(73) Assignee: Corning Incorporated, Corning, NY (US)

( * ) Notice: Subject to any disclaimer, the term of this patent is extended or adjusted under 35 U.S.C. 154(b) by 151 days.

(21) Appl. No.: 16/577,490

(22) Filed: Sep. 20, 2019

(65) Prior Publication Data
US 2020/0110203 A1    Apr. 9, 2020

Related U.S. Application Data

(60) Provisional application No. 62/740,618, filed on Oct. 3, 2018.

(51) Int. Cl.
*G02B 5/08* (2006.01)

(52) U.S. Cl.
CPC .................. *G02B 5/0858* (2013.01)

(58) Field of Classification Search
CPC .................. G02B 5/08–10; C22C 21/02–04
See application file for complete search history.

(56) References Cited

U.S. PATENT DOCUMENTS

| | | | |
|---|---|---|---|
| 2,690,422 A | 9/1954 | Szekely | |
| 5,071,596 A * | 12/1991 | Goela | B64G 1/66 264/1.21 |
| 5,565,052 A | 10/1996 | Papenburg et al. | |
| 5,825,565 A | 10/1998 | Papenburg et al. | |
| 2006/0292301 A1 | 12/2006 | Herner | |
| 2011/0051267 A1 | 3/2011 | Kierey et al. | |
| 2014/0176926 A1 | 6/2014 | Bowering et al. | |
| 2017/0269265 A1 | 9/2017 | Benson et al. | |
| 2018/0180777 A1 | 6/2018 | Crifasi et al. | |
| 2018/0231698 A1 | 8/2018 | Sutherland et al. | |

FOREIGN PATENT DOCUMENTS

| | | |
|---|---|---|
| JP | 2005134680 A | 5/2005 |
| WO | 2017/161084 A1 | 9/2017 |

OTHER PUBLICATIONS

"Aluminum-Silicon Alloys". Total Materia, http://www.totalmateria.com/Article80.htm, (2013).*

(Continued)

*Primary Examiner* — Prashant J Khatri
(74) *Attorney, Agent, or Firm* — Kevin L. Bray

(57) ABSTRACT

A support for optical elements is described. The support includes a base substrate with high specific stiffness and a finishing layer. The base substrate is a non-oxide ceramic material, preferably a carbide, such as boron carbide or silicon carbide. The finishing layer is preferably Ge or an alloy of Al and Si. The finishing layer is or is capable of being processed to provide a surface with low finish. Low finish is achieved by diamond turning or polishing the finishing material. The finishing layer has a coefficient of thermal expansion similar to the coefficient of thermal expansion of the base substrate. The optical element optionally includes a reflective stack on the finishing layer.

19 Claims, 2 Drawing Sheets

(56) References Cited

OTHER PUBLICATIONS

Cverna; "Thermal Properties of Metals" ; ASM International (2002); 7 Pages.
Johnson et al; "Rapid Fabrication of Lightweight Silicon Carbide Mirrors" ; Proceedings of SPIE, vol. 4771; (2002) pp. 243-253.
International Search Report and Written Opinion of the European International Searching Authority; PCT/US2019/053934; dated Jan. 2, 2020; 11 Pgs.

* cited by examiner

REFLECTIVE OPTICAL ELEMENT

This application claims the benefit of priority to U.S. Provisional Application Ser. No. 62/740,618 filed on Oct. 3, 2018, the content of which is relied upon and incorporated herein by reference in its entirety.

FIELD

This description pertains to optical elements. More particularly, this description pertains to optical elements that include a reflective layer on a support having a surface with low finish. Most particularly, this description pertains to supports for optical elements that include a base substrate with high specific stiffness and a finishing layer with low finish.

BACKGROUND

Size, weight and power (SWAP) are key design parameters for optical systems slated for use in applications where portability and mobility are advantageous. Size and weight can be directly impacted by the design of the optical system whereas power is indirectly impacted since lighter systems require less power to move.

Design choices for optical systems are generally based on refractive optical elements or reflective optical elements. When designing lightweight optical systems, several factors favor the use of reflective optical elements. First, minimizing the number of optical elements in a system reduces the weight of the system. Maintaining system performance with fewer elements, however, requires use of optics with precision aspheric or free form surfaces. Such optics are best achieved with materials that can be diamond turned.

Second, size and weight can be reduced in multispectral systems in designs that focus all spectral bands through a single aperture. Due to the wavelength dependence of refractive index, multispectral focusing is difficult to accomplish with refractive optics. Reflective optics, however, can readily focus light over wide spectral ranges to a common focal point.

Third, system weight can be reduced by minimizing the weight of individual optical elements. Light weighting can be achieved, for example, through structural optimizations such as thinning the optical element. Thinning, however, is impractical for refractive optics because refractive power requires sufficient thickness of the optic. The optical effect in reflective optics, in contrast, depends only on the surface region and it is generally possible to thin the substrate supporting the reflective surface to a degree consistent with requirements of mechanical integrity to reduce weight.

Fourth, system weight can be reduced by selecting low density materials for optical elements. The need for transmissivity through refractive optics limits the selection of materials and prevents the use of many desirable substrates. Far fewer limitations apply to substrates for reflective elements. Even if a particular substrate material has poor reflection over a spectral band of interest, it is normally possible to achieve desired performance by depositing a thin reflective film on the surface of the substrate.

Based on the above considerations, reflective optics utilizing low density, structurally optimized mirrors that feature surfaces amenable to diamond turning to achieve low finish are the preferred design choice for wide or multiband portable optical systems.

As new applications emerge, more demanding requirements are imposed on reflective optical elements. There is currently a need for lightweight reflective optical elements that can maintain precise figure under dynamic conditions for both aerospace and commercial applications. For commercial applications, high speed scanners require lightweight mirrors to maintain the flatness of the reflective surface under extreme oscillating or rotating acceleration loads. For airborne surveillance and targeting applications, lightweight mirrors are required to maintain accurate figure in the vibratory and thermal environments aircraft vibration and thermal environments. For space applications, lightweight mirrors are required to maintain accurate figure under various actuating and/or spacecraft accelerations and thermal environments. For spacecraft, weight is also a major consideration due to the cost per pound of launching a satellite into space. Also, for space environments, materials that block cosmic radiation are often an advantage and/or are required to protect the detectors.

The need for lightweight mirrors that maintain precise figure under demanding conditions has motivated a search for new low density substrates that exhibit high stiffness.

SUMMARY

The present disclosure provides a support for reflective optical elements and reflective optical elements that include the support. The support includes a base substrate and a finishing layer. The base substrate comprises a non-oxide ceramic material with high specific stiffness, preferably a carbide, such as boron carbide or silicon carbide. A finishing layer is a layer capable of being processed to a lower surface roughness than the base substrate. The finishing layer is preferably capable of being processed to a finish less than 25 Å rms (root mean square) roughness. When the finishing layer is processed, the finishing layer includes a surface with a finish less than 25 Å rms (root mean square) roughness. The finishing layer has a coefficient of thermal expansion (CTE) within ±20% of the coefficient of thermal expansion (CTE) of the base substrate. Methods of processing the finishing layer include diamond turning, magnetorheological finishing, and polishing. The optical element optionally includes a reflective layer on the finishing layer. Methods for forming the finishing layer on the base substrate are also described.

The present disclosure extends to:

An optical element comprising:

a base substrate, the base substrate comprising a non-oxide ceramic, the base substrate having a first coefficient of expansion; and a finishing layer in contact with the non-oxide ceramic, the finishing layer comprising Ge, Al, or Si and having a second coefficient of thermal expansion, the second coefficient of thermal expansion being within ±20% of the first coefficient of thermal expansion.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

The embodiments set forth in the drawings are illustrative in nature and not intended to be limiting of the scope of the detailed description or claims. Whenever possible, the same reference numeral will be used throughout the drawings to refer to the same or like feature.

DETAILED DESCRIPTION

Figure 1:
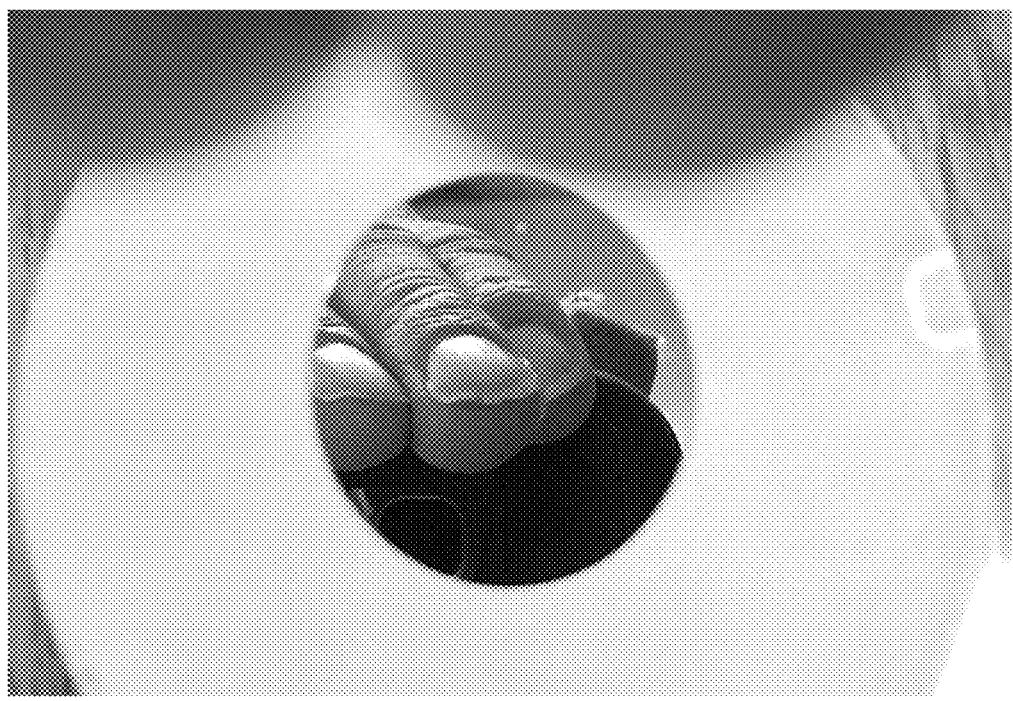
FIG. 1 shows a support with a boron carbide base substrate, a SiC/Si adhesion layer, and a Ge finishing layer.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purpose of describing particular aspects only and is not intended to be limiting.

Disclosed are components (including materials, compounds, compositions, and method steps) that can be used for, in conjunction with, in preparation for, or as embodiments of the disclosed reflective optical elements and methods for making reflective optical elements. It is understood that when combinations of component are disclosed, each component individually and each sub-combination of two or more components is also contemplated and disclosed herein even if not explicitly stated. If, for example, if a combination of components A, B, and C is disclosed, then each of A, B, and C is individually disclosed as is each of the sub-combinations A-B, B-C, A-C, and A-B-C. This concept applies to all aspects of this disclosure including, but not limited to, components corresponding to materials, compounds, compositions, and steps in methods.

In this specification and in the claims which follow, reference will be made to a number of terms which shall be defined to have the following meanings:

As used herein, contact refers to direct contact or indirect contact. Elements in direct contact touch each other. Elements in indirect contact do not touch each other, but are joined through one or more intervening materials. Elements in contact may be rigidly or non-rigidly joined. Contacting refers to placing two elements in direct or indirect contact. Elements in direct (indirect) contact may be said to directly (indirectly) contact each other.

Ordering of layers in a sequence of layers in the present optical elements will be described relative to the base substrate. Description of the ordering of the layers herein is irrespective of the orientation of the base substrate.

Unless otherwise specified herein, the terms "finish" or "surface finish" refer to the root-mean-square (rms) roughness of a surface. A surface with low roughness is said to have a low finish and a surface with high roughness is said to have a high finish. Optical surfaces with low finish are smoother and are preferable for the optical elements described herein.

Reference will now be made in detail to illustrative embodiments of the present description.

The present description provides a support for reflective optical elements. The support has light weight, high specific stiffness, and a finishing layer with a low finish or a finishing layer capable of being processed to a low finish. The present description also provides reflective optical elements utilizing the support. The reflective optical element may also include a reflective layer or a reflective stack on the finishing layer of the support. A reflective stack is a combination of two or more layers that cooperate to provide reflection or other optical effect.

The support includes a base substrate and a finishing layer on the base substrate. The finishing layer is in direct or indirect contact with the base substrate. As used herein, finishing layer refers to a layer that improves (lowers) the finish of the base substrate. Base substrates that are light weight and have high specific stiffness are often made from materials having rough surfaces that are difficult to finish to low roughness. A finishing layer is a layer added to the surface of a base substrate that has a surface that has, or is capable of being processed to have, a lower finish than the surface (processed or not) of the base substrate. The finishing layer is applied to a processed or unprocessed surface of a base substrate. The finishing layer has a finish lower than the finish of the processed or unprocessed surface of the base substrate and provides a smoother surface for deposition of subsequent layers (e.g. a reflective layer). The finish of the surface of the finishing layer is lower than the finish of the processed or unprocessed surface of the base substrate upon deposition of the finishing layer and/or upon processing the surface of the finishing layer after deposition. Preferably, the finishing layer has a surface capable of being processed to a finish less than 25 Å rms (root mean square) roughness or is a layer with a surface having a finish less than 25 Å rms (root mean square) roughness. One or more additional layers (e.g. reflective layer, adhesion layer, tuning layer, and/or protective layer) are optionally in contact with the finishing layer.

The support may also include one or more intervening layers between the finishing layer and the base substrate. The one or more intervening layers may include an adhesion layer that improves adhesion of the finishing layer to the base substrate.

Selection of the base substrate is motivated by the design objectives of light weight and retention of figure in mechanically demanding applications. One property guiding selection of the base substrate material is specific stiffness, which is defined as the ratio (E/ρ) of elastic modulus (E) to density (ρ). Other relevant material properties include coefficient of thermal expansion (CTE), dimensional stability, environmental compatibility (corrosion, radiation), finishing capabilities (e.g. ability to diamond turn and/or polish to optical quality); compatibility with reflective coatings, and cost.

For extreme lightweight mirrors, beryllium (Be) is the de facto standard. Be has the highest specific stiffness of any metal (E=4.25×10$^7$ lf$_f$/in$^2$, ρ=0.067 lb$_m$/in$^3$, E/ρ=6.34×10$^8$ lb$_f$-in/lb$_m$) and is suitable for space applications because of its ability to block cosmic radiation. The finished cost of Be mirrors is very high, however, and Be cannot be directly machined or processed to a low finish. Low finish of Be substrates requires plating of the surface Be with a material capable of being processed (e.g. diamond turned or polished) to low finish. Toxicity is a key drawback of Be. Dust or fumes from Be processing carry significant health risks (berylliosis). Because of the drawbacks associated with Be, Be mirrors are reserved for applications in which the material performance of Be far outweighs the cost (typically space applications).

The present description provides base substrates with performance comparable to Be that lack the drawbacks associated with Be. The only class of materials with specific stiffness comparable to Be is ceramics. Certain non-oxide ceramics, in particular, have high specific stiffness. In aspects herein, the base substrate is a non-oxide ceramic. Preferred base substrates include carbides. Representative carbides include boron carbide and silicon carbide. Boron carbide has a specific stiffness of 7.47×10$^8$ lb$_f$-in/lb$_m$ and silicon carbide has a specific stiffness of 5.54×10$^8$ lb$_f$-in/lb$_m$. Boron carbide blocks cosmic radiation and can be used in aerospace applications. Both materials can also be hot pressed and/or machined to near net shape.

Carbides have not been widely used as supports for reflective optics because they have high hardness and cannot be directly processed to a surface finish less than 50 Å rms (root mean square). Carbides, for example, are not amenable to diamond turning or polishing to obtain a surface with a finish less than 50 Å rms (root mean square) roughness. As a result, it becomes desirable to apply a finishing layer to carbides that is capable of being processed to a surface finish lower than 50 Å rms (root mean square) roughness. Low surface finish is desired because roughness present on the surface of a support is replicated in layers formed on the support. To maximize the reflection of reflecting optical elements, it is essential to minimize the roughness of the reflecting surface. The presence of roughness on a reflecting surface leads to deleterious effects such as distortion of the optical signal or a reduction in optical efficiency.

In applications requiring high stability of figure in mechanically demanding deployment environments, it has heretofore been challenging to find a suitable material for the finishing layer for carbide supports. Materials currently used as finishing layers for carbides tend to delaminate due to weak adhesion and are operable over a limited temperature range due to a mismatch in the coefficient of thermal expansion of the finishing layer and the carbide support. This description provides a finishing layer that exhibits good adhesion to carbide base substrates and a good match of thermal expansion coefficient with carbide base substrates.

A support for optical elements is described herein. The support includes a base substrate and a finishing layer. The base substrate is a ceramic material. In preferred embodiments, the base substrate is a non-oxide ceramic material. Preferred non-oxide ceramic materials include carbides such as boron carbide (B$_4$C) or silicon carbide (SiC). In one embodiment, the finishing layer has a surface with a finish less than 25 Å rms (root mean square) roughness. In another embodiment, the finishing layer lacks a surface with a finish less than 25 Å rms (root mean square) roughness, but is capable of being processed to a finish less than 25 Å rms (root mean square) roughness.

The specific stiffness of the base substrate is at least 2.0×10$^8$ lb$_f$-in/lb$_m$, or at least 4.0×10$^8$ lb$_f$-in/lb$_m$, or at least 6.0×10$^8$ lb$_f$-in/lb$_m$, or at least 7.0×10$^8$ lb$_f$-in/lb$_m$, or in the range from 2.0×10$^8$ lb$_f$-in/lb$_m$ to 1.0×10$^9$ lb$_f$-in/lb$_m$, or in the range from 3.0×10$^8$ lb$_f$-in/lb$_m$ to 9.0×10$^8$ lb$_f$-in/lb$_m$, or in the range from 4.0×10$^8$ lb$_f$-in/lb$_m$ to 8.0×10$^9$ lb$_f$-in/lb$_m$, or in the range from 4.5×10$^8$ lb$_f$-in/lb$_m$ to 7.5×10$^9$ lb$_f$-in/lb$_m$.

The coefficient of thermal expansion of the base substrate is in the range from 1.0×10$^{-6}$/° C.-9.0×10$^{-6}$/° C., or in the range from 2.0×10$^{-6}$/° C.-8.0×10$^{-6}$/° C., or in the range from 3.0×10$^{-6}$/° C.-7.0×10$^{-6}$/° C., or in the range from 4.0×10$^{-6}$/° C.-6.0×10$^{-6}$/° C.

Representative finishing layers include Ge, alloys of Al and Si, Al$_2$O$_3$, Zr, Hf, and W. Alloys of Al and Si include greater than 50 wt % Al, or greater than 60 wt % Al, or greater than 70 wt % Al, or greater than 80 wt % Al, or greater than 90 wt % Al. The amount of Si in that alloy is in the range from 1 wt %-45 wt %, or in the range from 2 wt %-35 wt %, or in the range from 3 wt %-30 wt %, or in the range from 4 wt %-25 wt %. Al has a higher coefficient of thermal expansion than most carbide base substrates, while Si has a lower coefficient of thermal expansion than most carbide base substrates. By alloying Al with Si, the coefficient of thermal expansion can be controlled to provide a close match with a carbide base substrate. Techniques for forming the finishing layer include PVD (physical vapor deposition), CVD (chemical vapor deposition), sputtering, evaporation, and plating. The finishing layer is in direct or indirect contact with the base substrate.

Upon deposition, the finishing layer may or may not have a surface finish less than 25 Å rms (root mean square) roughness. In some embodiments, the finishing layer is processed to include a surface with a finish less than 25 Å rms (root mean square) roughness, or a finish less than 20 Å rms (root mean square) roughness, or a finish less than 15 Å rms (root mean square) roughness, or a finish less than 10 Å rms (root mean square) roughness, or a finish less than 10 Å rms (root mean square) roughness, or a finish in the range from 5 Å rms (root mean square) roughness-25 Å rms (root mean square) roughness, or a finish in the range from 5 Å rms (root mean square) roughness-20 Å rms (root mean square) roughness, or a finish in the range from 5 Å rms (root mean square) roughness-15 Å rms (root mean square) roughness. Techniques for processing the finishing layer to reduce the finish include diamond turning, magnetorheological polishing, polishing with an abrasive slurry, ion beam figuring, and combinations thereof. The same processing techniques are optionally used to process the surface of the base substrate to reduce its finish prior to deposition of the finishing layer.

The thickness of the finishing layer is in the range from 5-200 μm, or in the range from 10 μm-150 μm, or in the range from 20 μm-125 μm, or in the range from 30 μm-100 μm. As noted above, the finishing layer includes a surface that may or may not have been processed to reduce the finish. Processing to reduce the finish includes removal of a portion of the finishing layer. When processing is required or desired, the thickness of the finishing layer at the time of deposition can be adjusted to account for the anticipated removal of material needed to achieve a particular finish.

To minimize thermal stresses between the finishing layer and the base substrate in applications in which the optical element is subjected to thermal cycling over wide temperature ranges, it is preferable for the finishing layer to have a coefficient of thermal expansion that closely matches the coefficient of thermal expansion of the base substrate. In various aspects, the coefficient of thermal expansion of the finishing layer is within ±20% of the coefficient of thermal expansion of the base substrate, or within ±15% of the coefficient of thermal expansion of the base substrate, or within ±10% of the coefficient of thermal expansion of the base substrate, or within ±5% of the coefficient of thermal expansion of the base substrate. For example, if the coefficient of thermal expansion of the base substrate is 10 ppm/° C. ($10 \times 10^{-6}$/° C.) and the coefficient of thermal expansion of the finishing layer is within ±20% of the coefficient of thermal expansion of the base substrate, the coefficient of thermal expansion of the finishing layer is in the range from 8 ppm/° C. and 12 ppm/° C., which range corresponds to 10 ppm/° C.±20%.

To improve adhesion of the finishing layer, in certain aspects, an adhesion layer is placed between the finishing layer and the base substrate. Adhesion layers include boron carbide, silicon carbide, B, Si, carbides of transition metals (e.g. TiC, WC), transition metals (e.g. Ti, W, Ni, Cr), and combinations thereof. The sequence of layers for exemplary supports include:

base substrate\$B_4C$\B\finishing layer
base substrate\SiC\Si\finishing layer
base sub strate\B\finishing layer
base substrate\Si\finishing layer
base substrate\TiC\Ti\finishing layer
base substrate\TiC\B\finishing layer
base substrate\TiC\Si\finishing layer
base substrate\TiC\Ti\Ni or NiCr or Cr\finishing layer
base substrate\TiC\B\Ni or NiCr or Cr\finishing layer
base substrate\TiC\Si\Ni or NiCr or Cr\finishing layer
base substrate\WC\W\finishing layer
base substrate\WC\B\finishing layer
base substrate\WC\Si\finishing layer
base substrate\WC\W\Ni or NiCr or Cr\finishing layer
base substrate\WC\B\Ni or NiCr or Cr\finishing layer
base substrate\WC\Si\Ni or NiCr or Cr\finishing layer where the base substrate is $B_4C$ or SiC and the finishing layer is preferably Ge or an alloy of Al and Si.

The thickness of the adhesion layer is greater than 10 nm, or greater than 50 nm, or greater than 100 nm, or greater than 500 nm, or in the range from 10 nm to 1000 nm, or in the range from 20 nm to 500 nm, or in the range from 30 nm to 250 nm, or in the range from 40 nm to 200 nm.

In one aspect, the support disclosed herein functions as a support for an optical element that includes a variety of reflective layers or reflective stacks formed on the finishing layer. The reflective coating preferably provides high reflectivity in one or more of the visible (VIS), near infrared (NIR), shortwave infrared (SWIR), midwave infrared (MWIR), and long wave infrared (LWIR) bands. The reflective coating is a layer of a single material or a multilayer stack of two or more materials. In one embodiment, the reflective coating includes a reflective layer and one or more tuning layers. The reflective coating optionally includes a barrier layer, one or more interface layers, and one or more protective layers. When present, the one or more protective layers overlie the other layers in the stack.

Representative reflective layers include a metal layer, such as a transition metal layer. The reflective layer preferably has high reflectivity at wavelengths in the VIS, NIR, SWIR, MWIR, and LWIR spectral bands. The reflective metal is an elemental metal or a metal alloy. Exemplary reflective layers include one or more elements selected from the group consisting of Ag, Au, Al, Rh, Cu, Pt and Ni. The thickness of a reflective metal layer is in the range from 75 nm to 350 nm, or in the range from 80 nm to 150 nm, or in the range from 90 nm to 120 nm.

The reflective coating optionally includes one or more tuning layers. The one or more tuning layers are positioned between a protective layer of the reflective coating and the finishing layer. In one embodiment, the tuning layer(s) are positioned between a reflective layer and a protective layer(s) of the reflective coating. Tuning layer(s) are designed to optimize reflection in defined wavelength regions. Tuning layer(s) typically include an alternating combination of high and low refractive index materials, or high, intermediate, and low refractive index materials. Materials used for tuning layers are preferably low absorbing in the wavelength range of from 0.4 μm to 15.0 μm. Representative materials for tuning layers include $YbF_3$, $GdF_3$, $YF_3$, $YbO_xF_y$, $GdF_3$, $Nb_2O_5$, $Bi_2O_3$, and ZnS. The tuning layer(s) have a thickness in the range of 75 nm to 300 nm. In one embodiment, the reflective coating includes $YbF_3$ and ZnS as tuning layers.

In some aspects, a reflective layer and a tuning layer are in direct contact and in other aspects, one or more interface layers are present between a reflective layer and a tuning layer. The interface layer(s) promote adhesion or provide galvanic compatibility between the reflective layer and tuning layer. The interface layer(s) needs to have a thickness sufficient for adhesion, but must also be thin enough to minimize absorption of light reflected from the reflective layer. The interface layer(s) positioned between the reflective layer and the tuning layer(s) have a thickness in the range of 5 nm to 20 nm, or 8 nm to 15 nm, or 8 nm to 12 nm. The interface layer(s) positioned between the reflective layer and a tuning layer include one or more of $Nb_2O_5$, $TiO_2$, $Ta_2O_5$, $Bi_2O_3$, ZnS and $Al_2O_3$.

In one embodiment, the reflective layer is in direct contact with the finishing layer. In another embodiment, the optical element includes a barrier layer and/or an interface layer between the reflective layer and the finishing layer. In still another embodiment, the optical element includes a barrier layer in direct contact with the finishing layer. In yet another embodiment, the optical element includes a barrier layer in direct contact with the finishing layer and an interface layer in direct contact with the barrier layer. The interface layer promotes adhesion between the reflective layer and barrier layer, or between the reflective layer and the galvanic-compatibility layer. In some aspects, the interface layer insures galvanic compatibility of the reflective coating with the finishing layer, or galvanic compatibility of the barrier layer with the reflective layer. In some aspects, the barrier layer insures galvanic compatibility between the reflective layer and the graphite substrate. In other aspects, the barrier layer prevents corrosion of the reflective layer when the optical element is exposed to humidity or salt fog.

Representative barrier layers include $Si_3N_4$, $SiO_2$, TiAlN, TiAlSiN, $TiO_2$, DLC (diamond-like carbon), Al, CrN, and $Si_xN_yO_z$. The barrier layer has a thickness in the range from 100 nm to 50 μm, or in the range from 500 nm to 10 μm, or in the range from 1 μm to 5 μm. The thickness of the barrier layer can also be adjusted to accommodate changes in temperature without distorting the figure of the optical element. Thermal stresses increase as the operational temperature range increases, so thinner barrier layers are recommended to avoid figure distortion in deployment environments experiencing large swings in temperature. Thicker barrier layers, however, provide better resistance to corrosion.

Representative interface layers positioned between the finishing layer and a reflective layer include one or more of Ni, Cr, Ni—Cr alloys (e.g. Nichrome), Ni—Cu alloys (e.g. Monel), Ti, $TiO_2$, ZnS, Pt, $Ta_2O_5$, $Nb_2O_5$, $Al_2O_3$, AlN, $AlO_xN_y$, Bi, $Bi_2O_3$. $Si_3N_4$, $SiO_2$, $SiO_xN_y$, DLC (diamond-like carbon), $MgF_2$, $YbF_3$, and $YF_3$. The interface layer has a thickness in the range from 0.2 nm to 25 nm, where the lower end of the thickness range (e.g. 0.2 nm to 2.5 nm, or 0.2 nm to 5 nm) is appropriate when the interface layer is a metal (to prevent parasitic absorbance of light passing through the reflective coating) and the higher end of the thickness range (e.g. 2.5 nm to 25 nm, or 5 nm to 25 nm) is appropriate when the interface layer is a dielectric.

The protective layer provides resistance to scratches, resistance to mechanical damage, and chemical durability. Representative materials for the protective layer include $YbF_3$, $YbF_xO_y$, $YF_3$ and $Si_3N_4$. The protective layer(s) is the top layer of the reflective coating. The protective layer(s) have a thickness in the range of 60 nm to 200 nm.

EXAMPLES

A support including a boron carbide base substrate, an adhesion layer, and a finishing layer was prepared. The adhesion layer included a layer of SiC and a layer of Si. The finishing layer was Ge. The sequence of layers was boron carbide\SiC\Si\Ge.

A boron carbide base substrate was cleaned, loaded in a vacuum chamber, and heated to under vacuum to outgas residual contaminants to remove them before forming the finishing layer. Typical temperatures for outgassing are between 200° C. and 250° C. The time of heating depends on the porosity of the boron carbide base substrate and is typically in the range from 2 hr-24 hr. After heating, the surface of the boron carbide base substrate was treated with ion bombardment. Ion bombardment conditions the surface to improve adhesion of an adjacent subsequent layer to the base substrate.

A 70 nm thick SiC layer was formed on the conditioned surface of the boron carbide base substrate and a 700 nm thick Si layer was formed on the SiC layer. The SiC/Si layer combination improves adhesion of the Ge finishing layer.

Figure 2:
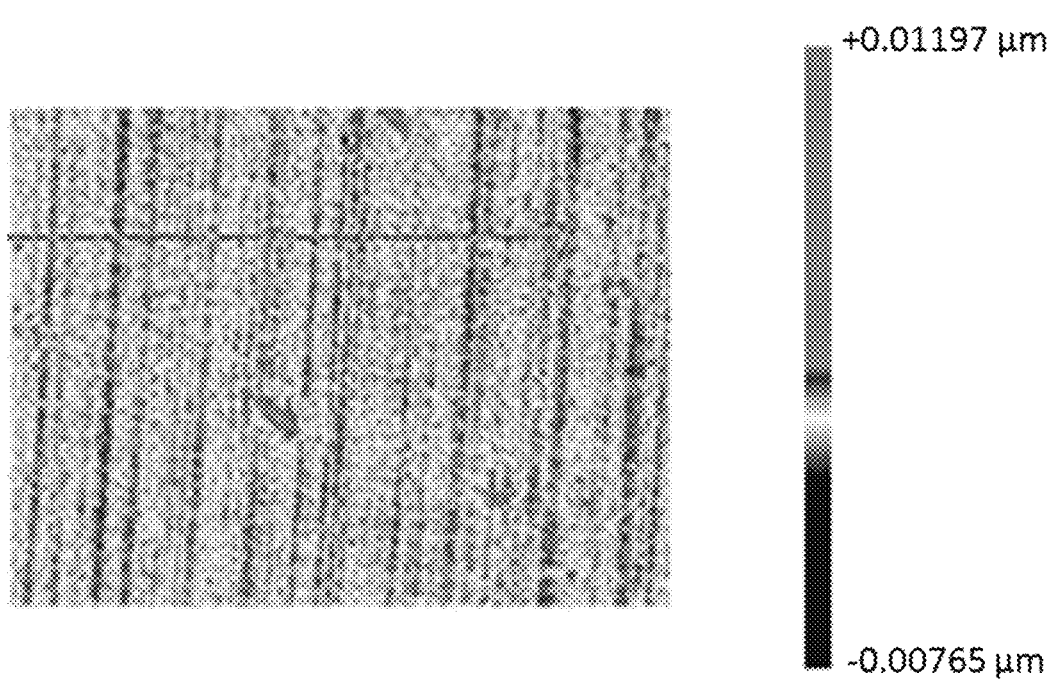
FIG. 2 shows an image of a portion of the surface of the support shown in FIG. 1.

A 100 μm thick layer of Ge was deposited on the Si layer using DC magnetron sputtering. The Ge finishing layer was processed by diamond turning to reduce roughness. FIG. 1 shows the support after processing of the Ge finishing layer and demonstrates the highly specular surface of the Ge finishing layer. FIG. 2 shows an image of a representative portion of the surface of the Ge finishing layer. The image shown in FIG. 2 was obtained with a Zygo profilometer. Analysis of the image indicated that the finish was 6.6 Å rms (root-mean-square) roughness (average of five measurement positions on the surface). The figure of the surface was determined to be ~1 wave peak-to-valley using a He—Ne laser (632.8 nm).

Aspect 1 of the description is:
An optical element comprising:
a base substrate, the base substrate comprising a non-oxide ceramic, the base substrate having a first coefficient of expansion; and
a finishing layer in contact with the non-oxide ceramic, the finishing layer comprising Ge, Al or Si and having a second coefficient of thermal expansion, the second coefficient of thermal expansion being within ±20% of the first coefficient of thermal expansion Aspect 2 of the description is:
The optical element of Aspect 1, wherein the non-oxide ceramic comprises boron carbide or silicon carbide.

Aspect 3 of the description is:
The optical element of Aspect 1 or 2, wherein the non-oxide ceramic has a specific stiffness of at least $4.0 \times 10^8$ $lb_f$-in/$lb_m$.

Aspect 4 of the description is:
The optical element of Aspect 1 or 2, wherein the non-oxide ceramic has a coefficient of thermal expansion in the range from $3.0 \times 10^{-6}$/° C.-$7.0 \times 10^{-6}$/° C.

Aspect 5 of the description is:
The optical element of any of Aspects 1-4, wherein the finishing layer comprises an alloy of Al and Si.

Aspect 6 of the description is:
The optical element of Aspect 5, wherein the finishing layer comprises the alloy of Al and Si includes 1 wt %-45 wt % of Si.

Aspect 7 of the description is:
The optical element of Aspect 5, wherein the finishing layer comprises the alloy of Al and Si includes 4 wt %-25 wt % of Si.

Aspect 8 of the description is:
The optical element of any of Aspects 1-7, wherein the finishing layer comprises a diamond-turned surface.

Aspect 9 of the description is:
The optical element of any of Aspects 1-8, wherein the finishing layer comprises a surface with a finish less than 25 Å rms (root-mean-square) roughness.

Aspect 10 of the description is:
The optical element of any of Aspects 1-8, wherein the finishing layer comprises a surface with a finish less than 10 Å rms (root-mean-square) roughness.

Aspect 11 of the description is:
The optical element of any of Aspects 1-10, wherein the finishing layer is in direct contact with the non-oxide ceramic.

Aspect 12 of the description is:
The optical element of any of Aspects 1-11, wherein the coefficient of thermal expansion of the finishing layer is within ±10% of the coefficient of thermal expansion of the base substrate.

Aspect 13 of the description is:
The optical element of any of Aspects 1-11, wherein the coefficient of thermal expansion of the finishing layer is within ±5% of the coefficient of thermal expansion of the base substrate.

Aspect 14 of the description is:
The optical element of any of Aspects 1-10, further comprising an adhesion layer positioned between the base substrate and the finishing layer.

Aspect 15 of the description is:
The optical element of Aspect 14, wherein the adhesion layer comprises B or Si.

Aspect 16 of the description is:
The optical element of Aspect 14 or 15, wherein the adhesion layer comprises a carbide.

Aspect 17 of the description is:
The optical element of any of Aspects 14-16, wherein the adhesion layer comprises a transition metal.

Aspect 18 of the description is:
The optical element of Aspect 14, wherein the adhesion layer comprises a layer of SiC and a layer of Si.

Aspect 19 of the description is:
The optical element of Aspect 14, wherein the adhesion layer comprises a layer of boron carbide and a layer of B.

Aspect 20 of the description is:
The optical element of any of Aspects 14-19, wherein the adhesion layer is in direct contact with the base substrate and the finishing layer.

Aspect 21 of the description is:

The optical element of any of Aspects 1-20, further comprising a reflective layer in contact with the finishing layer, the reflective layer comprising a metal or a metal alloy, the metal or metal alloy comprising an element selected from the group consisting of Ag, Au, Al, Rh, Cu, Pt and Ni.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. An optical element comprising:
   a base substrate, the base substrate comprising a non-oxide ceramic, the base substrate having a first coefficient of expansion; and
   a finishing layer in contact with the non-oxide ceramic, the finishing layer comprising an alloy of Al and Si and having a second coefficient of thermal expansion, the second coefficient of thermal expansion being within ±20% of the first coefficient of thermal expansion; wherein the finishing layer comprises a surface with a finish less than 25 Å rms (root-mean-square) roughness.
2. The optical element of claim 1, wherein the non-oxide ceramic comprises boron carbide or silicon carbide.
3. The optical element of claim 1, wherein the non-oxide ceramic has a specific stiffness of at least $4.0 \times 10^8$ $lb_f$-in/$lb_m$.
4. The optical element of claim 1, wherein the non-oxide ceramic has a coefficient of thermal expansion in the range from $3.0 \times 10^{-6}$/° C.-$7.0 \times 10^{-6}$/° C.
5. The optical element of claim 1, wherein the finishing layer comprises the alloy of Al and Si includes 1 wt %-45 wt % of Si.
6. The optical element claim 1, wherein the finishing layer comprises the alloy of Al and Si includes 4 wt %-25 wt % of Si.
7. The optical element of claim 1, wherein the finishing layer comprises a diamond-turned surface.
8. The optical element of claim 1, wherein the finishing layer comprises a surface with a finish less than 10 Å rms (root-mean-square) roughness.
9. The optical element of claim 1, wherein the finishing layer is in direct contact with the non-oxide ceramic.
10. The optical element of claim 1, wherein the coefficient of thermal expansion of the finishing layer is within ±10% of the coefficient of thermal expansion of the base substrate.
11. The optical element of claim 1, wherein the coefficient of thermal expansion of the finishing layer is within ±5% of the coefficient of thermal expansion of the base substrate.
12. The optical element of claim 1, further comprising an adhesion layer positioned between the base substrate and the finishing layer.
13. The optical element of claim 12, wherein the adhesion layer comprises B or Si.
14. The optical element of claim 12, wherein the adhesion layer comprises a carbide.
15. The optical element of claim 12, wherein the adhesion layer comprises a transition metal.
16. The optical element of claim 12, wherein the adhesion layer comprises a layer of SiC and a layer of Si.
17. The optical element of claim 12, wherein the adhesion layer comprises a layer of boron carbide and a layer of B.
18. The optical element of claim 12, wherein the adhesion layer is in direct contact with the base substrate and the finishing layer.
19. The optical element of claim 1, further comprising a reflective layer in contact with the finishing layer, the reflective layer comprising a metal or a metal alloy, the metal or metal alloy comprising an element selected from the group consisting of Ag, Au, Al, Rh, Cu, Pt and Ni.

* * * * *

UNITED STATES PATENT AND TRADEMARK OFFICE
CERTIFICATE OF CORRECTION

| | | |
|---|---|---|
| PATENT NO. | : 11,226,438 B2 | Page 1 of 1 |
| APPLICATION NO. | : 16/577490 | |
| DATED | : January 18, 2022 | |
| INVENTOR(S) | : Bruce Hildreth Myrick et al. | |

It is certified that error appears in the above-identified patent and that said Letters Patent is hereby corrected as shown below:

In the Claims

In Column 12, Line 7, in Claim 6, delete "element" and insert -- element of --.

Signed and Sealed this
Tenth Day of May, 2022

Katherine Kelly Vidal
*Director of the United States Patent and Trademark Office*